(No Model.)

D. A. PATTERSON & E. ANDERSON.
AMALGAMATOR.

No. 512,895.   Patented Jan. 16, 1894.

WITNESSES:
J. A. Criswell
C. Sedgwick

INVENTORS
D. A. Patterson
E. Anderson
BY Munn & Co.
ATTORNEYS.

UNITED STATES PATENT OFFICE.

DOC. A. PATTERSON, OF SUMMITVILLE, COLORADO, AND EMERY ANDERSON, OF WHITE OAKS, TERRITORY OF NEW MEXICO, ASSIGNORS TO THEMSELVES, AND BENJAMIN H. DYE, OF WHITE OAKS, TERRITORY OF NEW MEXICO.

AMALGAMATOR.

SPECIFICATION forming part of Letters Patent No. 512,895, dated January 16, 1894.

Application filed February 2, 1893. Serial No. 460,687. (No model.)

*To all whom it may concern:*

Be it known that we, DOC. A. PATTERSON, of Summitville, in the county of Rio Grande and State of Colorado, and EMERY ANDERSON, of White Oaks, in the county of Lincoln and Territory of New Mexico, have invented a new and Improved Amalgamator, of which the following is a full, clear, and exact description.

The object of the invention is to provide a new and improved amalgamator, which is simple and durable in construction, very effective and economical in operation, and arranged to catch and retain all the precious metal contained in the pulp.

The invention also consists of certain parts and details and combinations of the same, as will be fully described hereinafter and then pointed out in the claim.

Reference is to be had to the accompanying drawings, forming a part of this specification, in which similar letters of reference indicate corresponding parts in all the figures.

Figure 1:
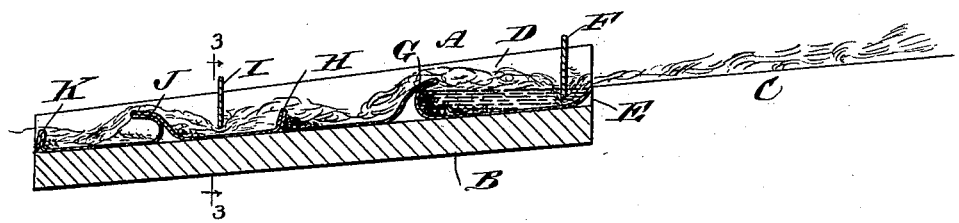
Figure 2:
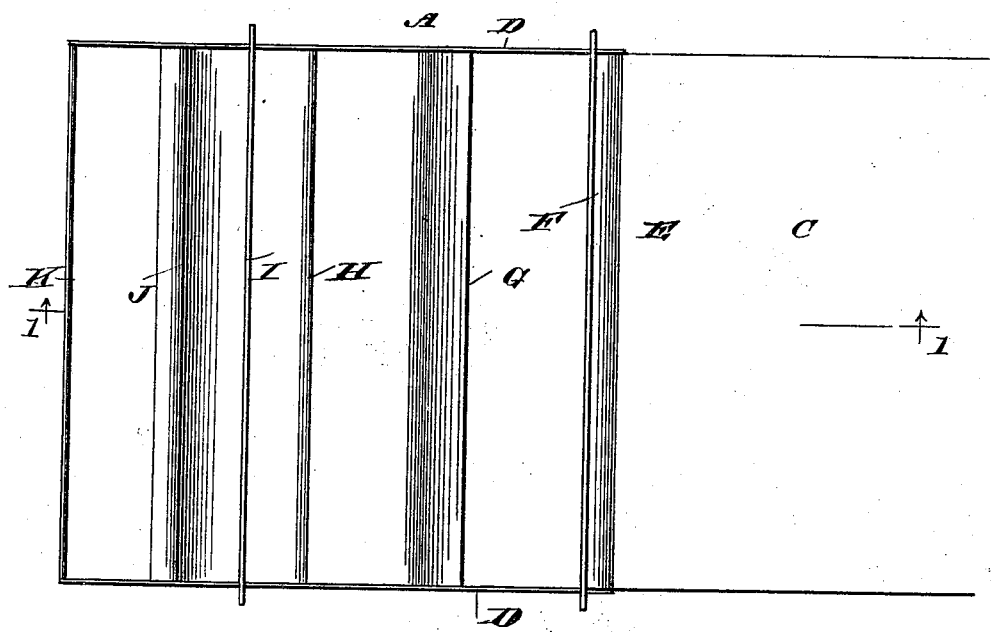
Figure 3:
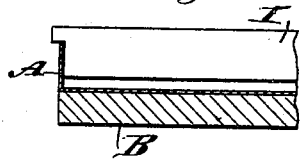

Figure 1 is a sectional side elevation of the improvement on the line 1—1 of Fig. 2. Fig. 2 is a plan view of the same; and Fig. 3 is a partial transverse section of the same on the line 3—3 of Fig. 1.

The improved amalgamator is provided with a pan A, made of copper or other suitable material galvanized or amalgamated as desired and supported on a suitable framework B, which latter as well as the pan A are held in an inclined position, as is plainly shown in Fig. 1. Into the upper end of the pan A discharges the apron C connecting the pan with the stamp mill, so that the pulp from the latter can flow over the said apron into the upper end of the pan A. The latter is provided with the usual two parallel sides D, and its upper end E is slightly curved upward, so that the pulp flowing over this curved upper end readily passes into the pan A.

In order to interrupt the flow of the pulp and to cause precious metals to come in contact with the bottom of the pan A, we provide a transversely extending gate F supported on the sides D of the pan A, its lower edge extending close to the bottom of the pan, so that the in-coming pulp must pass through the space formed between the lower end of the gate F and the bottom of the pan A. A transversely extending riffle G is formed a suitable distance below the gate F, and this riffle is curved, being preferably semi-circular, and extends upward so as to form a pocket for containing quicksilver or other suitable amalgamating material. Below the riffle G is a second, straight, vertically disposed riffle H, and below the same is a gate I similar to the gate F, and next to this gate is arranged a riffle J, which is curved similarly to the riffle G, but is bent in an opposite direction to the latter, that is downward, as is plainly shown in Fig. 1. On the lower end of the pan A is arranged a transversely extending riffle K, which is vertically disposed and similar to the riffle H. When the pulp flows over the apron C and over the curved upper end E into the pan A, then the material is deflected downward by the gate F, so as to come in contact with the bottom of the pan, and at the same time the material is more liable to come in contact with the quicksilver contained in the next semi-circular riffle G. The quicksilver in the latter furnishes a vibrating bed to which the sand and iron will not adhere, and its motion will cause the latter to pass over the top of the riffle into the next part of the pan containing the riffle H. It will be seen that the precious metal will be interrupted and taken up by the quicksilver in the semi-circular riffle G, so that only the lighter material will pass over the same to be again agitated in passing over the riffle H and under the gate I, to finally pass over the last semi-circular riffle J, which latter serves principally, in conjunction with the riffle K, for floured and other precious metals moving along with the sand and water, which impinge against this reverse riffle and feebly cling to it, so that the water passing this riffle J, receives a rolling motion and will cause and maintain a depression in the sand below the riffle, so that any mercury reaching this depression will be protected, will adhere to the pan, and will finally come to a state of rest in the semi-circular recess of the riffle, from which it may be removed by a small scoop manipulated by the operator. It will be understood that the operator also, from time to time, removes the material amalgamated in the riffle G and replaces mercury, so that the process will be kept up continuously. It will also be understood that the straight riffle H is used principally to agitate the flow, but it also serves to study or observe the condition of the semi-circular riffle above by turning a stream of water upon it by means of a hose, when it can be at once observed whether mercury is accumulating, in which case the upper riffle has become overloaded and requires immediate attention from the operator.

Having thus fully described our invention, we claim as new and desire to secure by Letters Patent—

As an improved article of manufacture the pan A, consisting in the parallel sides D D, the amalgamated metal bottom having reversely curved riffles G J, the former serving to retain a bed of mercury, the short intermediate riffle H, the lowermost riffle K, the transverse deflector plate F, across the upper end of the pan to cause the pulp passing thereunder to pass in a thin sheet over the mercury bed, the second plate I to act similarly on the pulp which passes the riffle H and spread it evenly over the riffle J to collect thereon the floured precious metal and also cause the water to so flow over said riffle J as to form a pocket thereunder for the trapping of any mercury which may have escaped past the upper riffles, substantially as set forth.

DOC. A. PATTERSON.
EMERY ANDERSON.

Witnesses to the signature of Doc. A. Patterson:
THOS. M. BOWEN,
GUS. F. JOHNSON.

Witnesses to the signature of Emery Anderson:
SIDNEY M. PARKER,
W. H. REYNOLDS.